(12) United States Patent
Minabe et al.

(10) Patent No.: US 8,050,164 B2
(45) Date of Patent: Nov. 1, 2011

(54) OPTICAL RECORDING DEVICE AND OPTICAL RECORDING AND REPRODUCTION DEVICE

(75) Inventors: Jiro Minabe, Kanagawa (JP); Yasuhiro Ogasawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 420 days.

(21) Appl. No.: 12/266,285

(22) Filed: Nov. 6, 2008

(65) Prior Publication Data

US 2009/0213718 A1    Aug. 27, 2009

(30) Foreign Application Priority Data

Feb. 26, 2008   (JP) ................................. 2008-044319

(51) Int. Cl.
*G11B 7/00* (2006.01)
(52) U.S. Cl. ...................................... 369/103
(58) Field of Classification Search .................... 369/103
See application file for complete search history.

(56) References Cited

U.S. PATENT DOCUMENTS

| 7,511,867 | B2 * | 3/2009 | Yasuda et al. | 359/29 |
| 7,639,587 | B2 * | 12/2009 | Sakaguchi et al. | 369/103 |
| 2007/0153663 | A1 * | 7/2007 | Fukumoto et al. | 369/103 |

FOREIGN PATENT DOCUMENTS

| EP | 1624451 A1 | 2/2006 |
| JP | 2006-301465 A | 11/2006 |
| KR | 10-2007-00150556 A | 1/2007 |

OTHER PUBLICATIONS

Chinese Office Action for Chinese Patent Application No. 200810183822.2 dated Jun. 11, 2010.

* cited by examiner

*Primary Examiner* — Latanya Bibbins
(74) *Attorney, Agent, or Firm* — Sughrue Mion, PLLC

(57) ABSTRACT

An optical recording device includes a light source, a spatial light modulator, a correcting optical system and a light guiding section. The spatial light modulator includes plural pixels, a signal light region that displays a signal light pattern, and a reference light region that displays a reference light pattern. The spatial light modulator modulates and outputs incident light for each pixel in accordance with a display pattern. The correcting optical system includes a pair of axicon lenses that correct the emitted light from the light source so as to flatten the light intensity distribution thereof on an irradiated surface of the spatial light modulator. The light guiding section guides the corrected light to the spatial light modulator. The signal light and the reference light are irradiated onto an optical recording medium simultaneously and a hologram is recorded into the optical recording medium.

10 Claims, 13 Drawing Sheets

BEAM HAVING GAUSSIAN
INTENSITY DISTRIBUTION

BEAM THAT HAS PASSED
THROUGH AXICON LENS SYSTEM

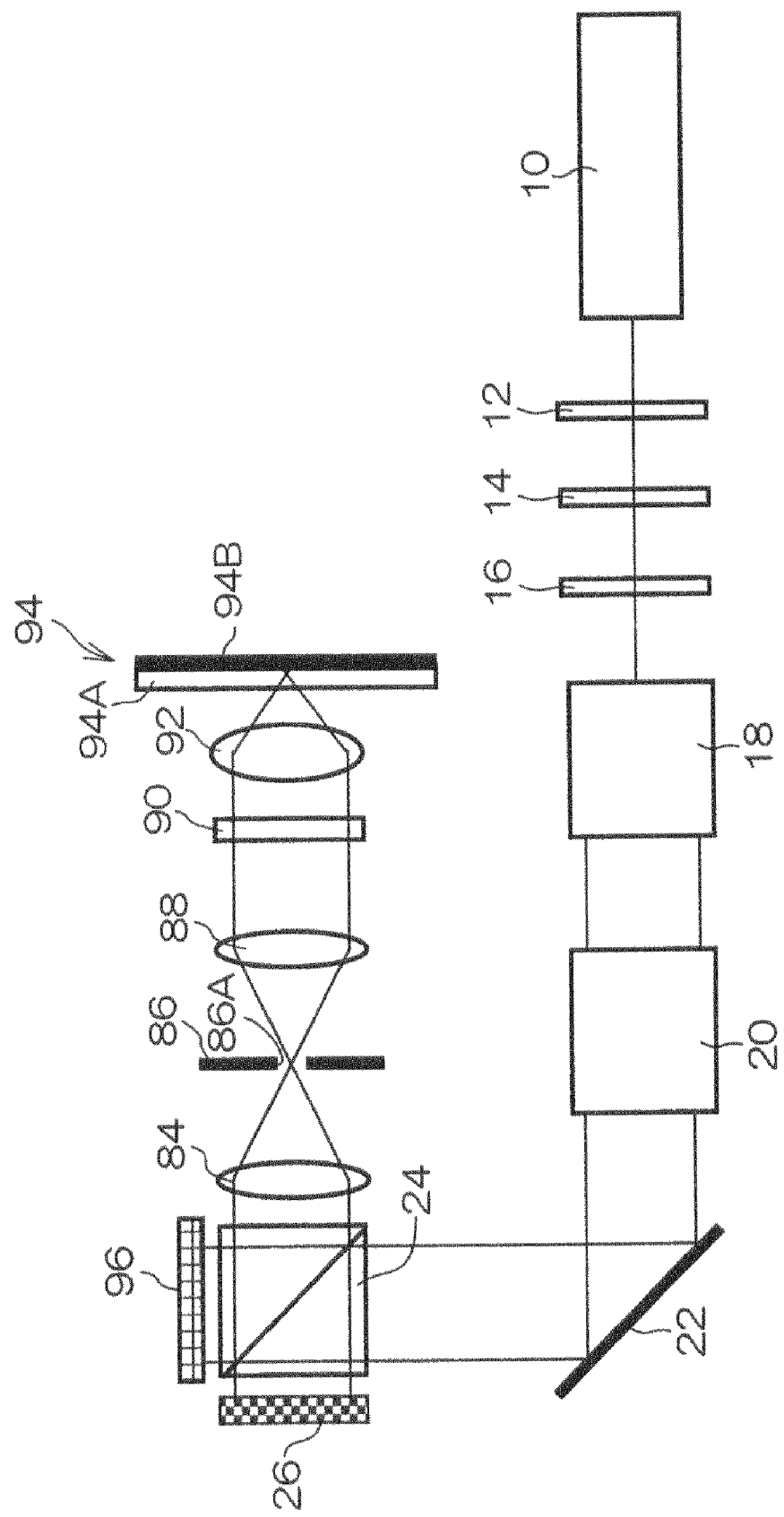

OPTICAL RECORDING DEVICE AND OPTICAL RECORDING AND REPRODUCTION DEVICE

CROSS-REFERENCE TO RELATED APPLICATION

This application is based on and claims priority under 35 USC 119 from Japanese Patent Application No. 2008-044319 filed Feb. 26, 2008.

BACKGROUND

1. Technical Field

The present invention relates to an optical recording device and an optical recording and reproduction device.

2. Related Art

Recently, as a holographic memory recording and reproduction method, there has been proposed the coaxial recording method (collinear method) that has advantages in that its optical system can be significantly simplified in comparison to the conventional two-beam interference method, it is resistant to external disturbance such as vibration, and the introduction of a servo mechanism is easy. In this collinear method, signal light and reference light that have been modulated and generated by a spatial light modulator are collected with the same optical axis by the same lens, and an interference fringe (diffraction grating) that is formed by the interference between the signal light and the reference light is recorded as a hologram on an optical recording medium. A signal light pattern in which digital data have been two-dimensionally encoded is displayed on the spatial light modulator, whereby the digital data are superposed on the signal light.

The optical recording medium on which the hologram has been recorded is irradiated with the reference light as reading light, whereby the signal light is reproduced from the recorded hologram. From this reproduced signal light, the superposed digital data can be decoded. However, in the conventional collinear method, since the signal light and the reference light are on the same optical axis, when the optical recording medium is irradiated with the reference light as reading light during reproduction, light leaking to the region of the spatial light modulator that corresponds to the signal light. For example, when the precision of liquid crystal elements that have been disposed as a transmissive spatial light modulator is low, the light that has been transmitted through the OFF pixels that are in display positions of the signal light pattern becomes leak light. Consequently, when all of the pixels of the spatial light modulator are irradiated with light in this manner, this leak light is detected by a photodetector, noise with respect to the reproduced signal light is generated, and reproduction characteristics deteriorate.

SUMMARY

According to an aspect of the invention, an optical recording device comprises a light source, a spatial light modulator, a correcting optical system, and a light guiding section. The light source emits coherent light. The spatial light modulator is formed from a plurality of pixels that are two-dimensionally arrayed, comprises a signal light region that displays a signal light pattern when generating signal light, and a reference light region that is disposed so as to surround the signal light region and displays a reference light pattern when generating reference light that is coaxial with the signal light, and modulates and outputs incident light for each pixel in accordance with a display pattern. The correcting optical system is disposed between the light source and the spatial light modulator, and comprises a pair of axicon lenses that correct the light that has been emitted from the light source so as to flatten the light intensity distribution thereof on an irradiated surface of the spatial light modulator. The light guiding section guides the light that has been corrected by the correcting optical system to the spatial light modulator. The signal light and the reference light generated by the spatial light modulator are irradiated onto an optical recording medium simultaneously and a hologram is recorded into the optical recording medium.

BRIEF DESCRIPTION OF THE DRAWINGS

An exemplary embodiment of the present invention will be described in detail on the basis of the attached drawings, wherein:

FIG. 11 is a schematic diagram showing the configuration of a coaxial reflective optical recording and reproduction device to which the axicon optical system has been introduced.

DETAILED DESCRIPTION

Below, an example of an exemplary embodiment of the present invention will be described in detail with reference to the drawings.

General Configuration of Optical Recording and Reproduction Device

Figure 1:
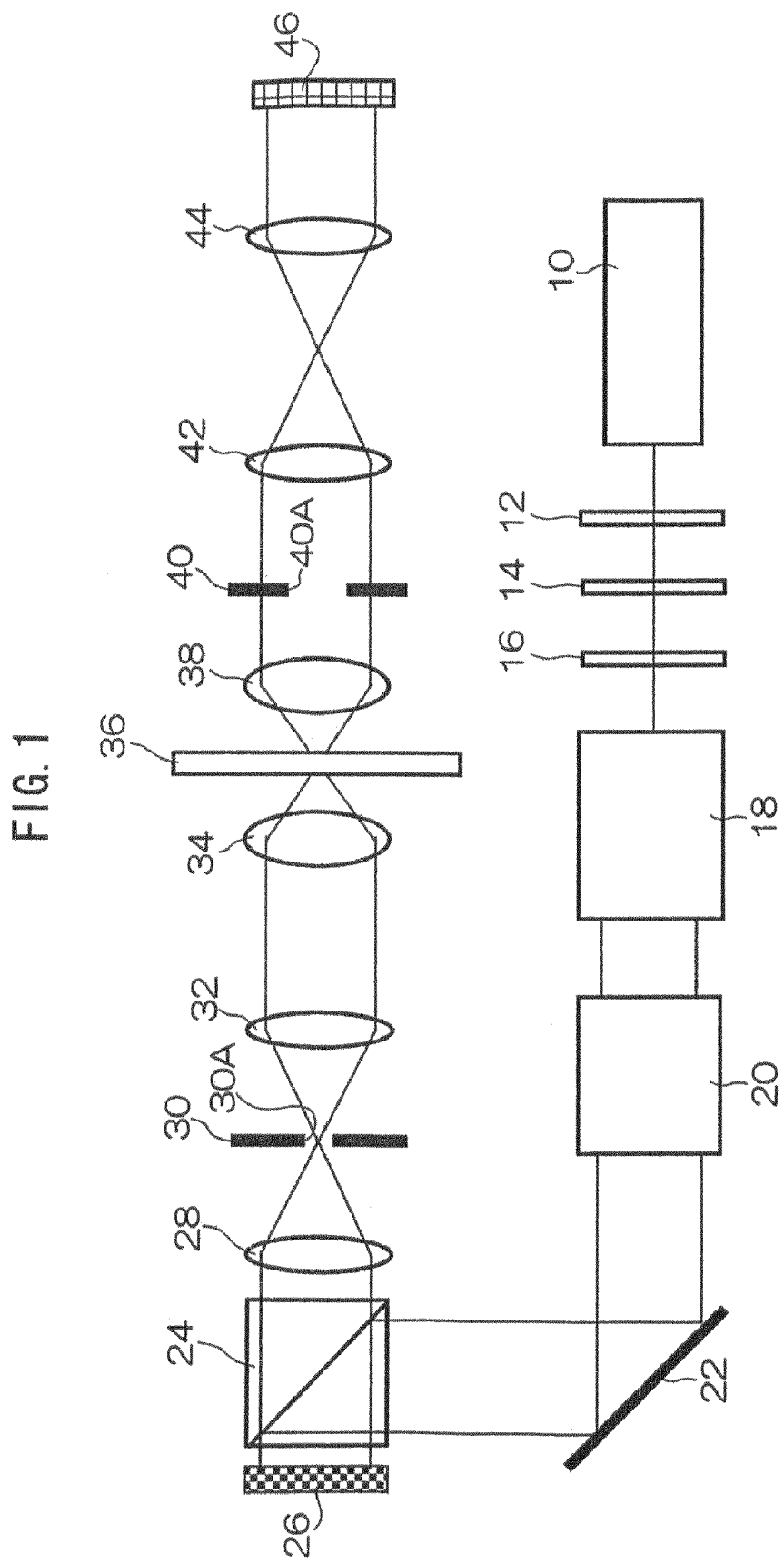
FIG. 1 is a schematic diagram showing the configuration of an optical recording and reproduction device pertaining to the exemplary embodiment of the present invention.

FIG. 1 is a schematic diagram showing the configuration of an optical recording and reproduction device pertaining to the exemplary embodiment of the present invention. This optical recording and reproduction device is a "coaxial recording method (collinear method)" optical recording and reproduction device that irradiates an optical recording medium with signal light and reference light that share an optical axis as recording light of one light beam from the same direction. In the present exemplary embodiment, a "coaxial transmissive" optical recording and reproduction device that uses a reflective spatial light modulator (SLM) and a transmissive optical recording medium will be described.

In the optical recording and reproduction device, there is disposed a light source 10 that emits laser light that is coherent light. As the light source 10, for example, a laser light source that emits green laser light whose emission wavelength is 532 nm is used. On the light exiting side of the light source 10, a shutter 12 that is capable of inserting into and withdrawing from (opening and closing) the optical path, a ½ wavelength plate 14 that applies a phase difference of ½ wavelength between linearly polarized components that are orthogonal, a polarizing plate 16 that allows light of a predetermined polarization direction to pass therethrough, a beam expander 18 that is an expanding/collimating optical system, an axicon optical system 20 that is used as a correcting optical system and a reflecting mirror 22 are disposed in this order along the optical path from the side of the light source 10. The shutter 12 is driven to open and close by a drive device (not shown) that is connected to a control device (not shown) such as a computer.

On the light reflecting side of the reflecting mirror 22, there is disposed a polarizing beam splitter 24 that reflects light of a predetermination polarization direction and transmits light of a polarization direction that is orthogonal thereto. When seen from the reflecting mirror 22 side, on the light reflecting side of the polarizing beam splitter 24, there is disposed a reflective spatial light modulator 26 that polarizes and modulates incident light per pixel. As the reflective spatial light modulator 26, there can be used liquid crystal on silicon (LCOS) or the like. The spatial light modulator 26 is connected to a control device (not shown) via a pattern generator (not shown). Each of the pixel portions of the spatial light modulator 26 is driven and controlled by this control device.

The pattern generator applies two-dimensional encoding to digital data that have been supplied from the control device to generate a signal light pattern that is displayed on the spatial light modulator 26. The signal light pattern is, for example, a digital pattern where binary digital data "0, 1" are expressed as "dark (black pixels), bright (white pixels)". On the spatial light modulator 26, in addition to the signal light pattern, a reference light pattern is also displayed. The reference light pattern is, for example, a random pattern. The spatial light modulator 26 modulates incident laser light in accordance with the displayed signal light pattern and reference light pattern to generate signal light and reference light. The spatial light modulator 26 reflects the generated signal light and reference light toward the polarizing beam splitter 24.

Figure 2A:
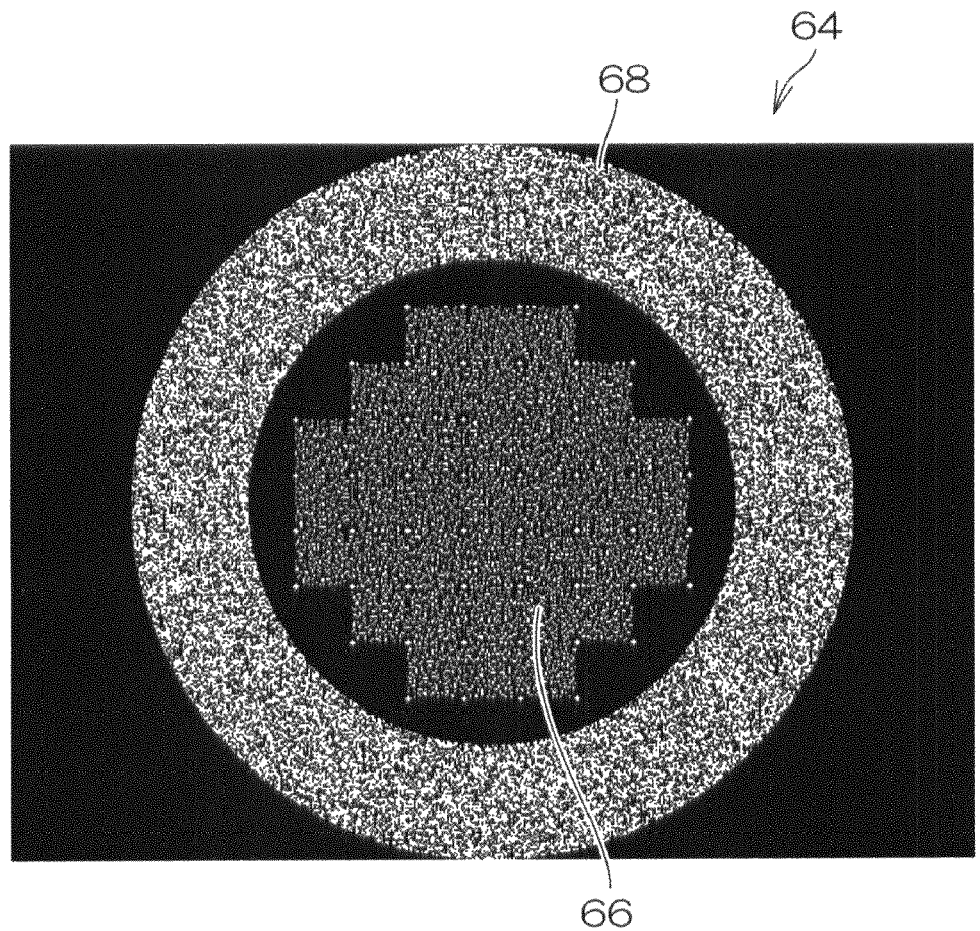
FIG. 2A is a diagram showing an example of a recording pattern that is displayed on a spatial light modulator during recording.

FIG. 2A is a diagram showing an example of a recording pattern that is displayed on the spatial light modulator 26 during recording. As shown in FIG. 2A, a recording pattern 64 includes a signal light pattern 66 that generates signal light and a ring-shaped reference light pattern 68 that generates reference light. The signal light pattern 66 is displayed in the central portion of the spatial light modulator 26. The reference light pattern 68 is displayed on the peripheral portion of the spatial light modulator 26 so as to surround this signal light pattern 66. The region that displays the signal light pattern is a signal light region, and the region that displays the reference light pattern is a reference light region. The shape of the signal light region and the shape of the reference light region can be appropriately altered in accordance with the recording pattern.

Figure 2B:
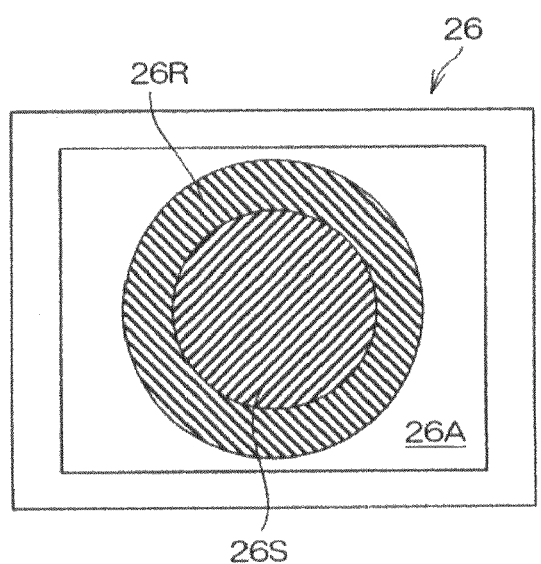
FIG. 2B is a plane view showing an example of a display region that is set on a display screen of the spatial light modulator.

FIG. 2B is a plane view showing an example of a display region that is set on a display screen 26A of the spatial light modulator 26. The size of the recording pattern and the pattern disposition are set beforehand in accordance with the size and the like of the display screen 26A. For example, in the present exemplary embodiment, as shown in FIG. 2B, on the display screen 26A of the spatial light modulator 26, there are respectively disposed a circular signal light region 26S and a ring-shaped reference light region 26R that surrounds the signal light region 26S.

The axicon optical system 20 is a correcting optical system at least which, during recording, corrects incident parallel light from the beam expander 18 so as to flatten its light intensity distribution on the display screen 26A of the spatial light modulator 26 and generates parallel light with which the spatial light modulator 26 is irradiated. Further, during reproduction, the axicon optical system 20 corrects incident parallel light from the beam expander 18 such that the signal light region 26S of the spatial light modulator 26 is not irradiated with laser light and generates parallel light with which the spatial light modulator 26 is irradiated.

In the present exemplary embodiment, during recording, the axicon optical system 20 generates parallel light whose cross-sectional shape that is orthogonal to the optical path is circular (below, called "circular parallel light") in order to irradiate the circular recording region that includes the signal light region 26S and the reference light region 26R with laser light. Further, during reproduction, the axicon optical system 20 generates parallel light whose cross-sectional shape that is orthogonal to the optical path is ring-shaped (below, called "ring-shaped parallel light") in order to irradiate the ring-shaped reference light region 26R with laser light. It will be noted that the axicon optical system 20 will be described in detail later.

On the polarizing beam splitter 24, the signal light and the reference light that have been generated by the spatial light modulator 26 are made incident. When seen from this spatial light modulator 26, on the light transmitting side of the polarizing beam splitter 24, a pair of lenses 28 and 32 and a Fourier transform lens 34 are disposed in this order along the optical path. The Fourier transform lens 34 Fourier-transforms recording light and irradiates an optical recording medium 36 with the Fourier-transformed recording light. The focal position of the Fourier transform lens 34 becomes a light collecting position where the recording light is collected. Between the lens 28 and the lens 32, in the vicinity of the beam waist, there is disposed a light blocking plate 30 that includes an opening portion (an aperture) 30A. It will be noted that the light blocking plate 30 is not essential and can be appropriately omitted.

On the light exiting side of the Fourier transform lens 34, there is disposed a holding stage (not shown) that holds the optical recording medium 36. The holding stage is driven by a drive device (not shown) that is connected to a control device (not shown) and moves in the optical axis direction or a plane direction that is perpendicular to the optical axis. The holding stage, for example, holds the optical recording medium 36 in a standard position where the film-thickness direction center position of the optical recording medium 36 becomes the focal position of the Fourier transform lens 34.

The optical recording medium 36 is an optical recording medium on which a hologram is capable of being recorded by a change in the index of refraction resulting from being irradiated with light. Examples of the optical recording medium 36 may include an optical recording medium that uses a recording material such as a photopolymer material, a photorefractive material or a silver halide photosensitive material.

On the light transmitting side of the optical recording medium 36, there are disposed a Fourier transform lens 38, a pair of lenses 42 and 44 and a sensor array 46. The sensor array 46 is configured by imaging elements such as CCDs or a CMOS array, converts reproduced light (diffracted light) that has been received into electrical signals and outputs the electrical signals. Between the lens 38 and the lens 42, there is disposed a light blocking plate 40 that includes an opening portion (an aperture) 40A with a large opening diameter. It will be noted that the light blocking plate 40 is not essential and can be appropriately omitted. Further, the sensor array 46 is connected to a control device (not shown). During reproduction, the sensor array 46 reads data that have been superposed on signal light that has been reproduced and outputs the data to a control device (not shown).

Configuration of Axicon Optical System

Figure 3A:
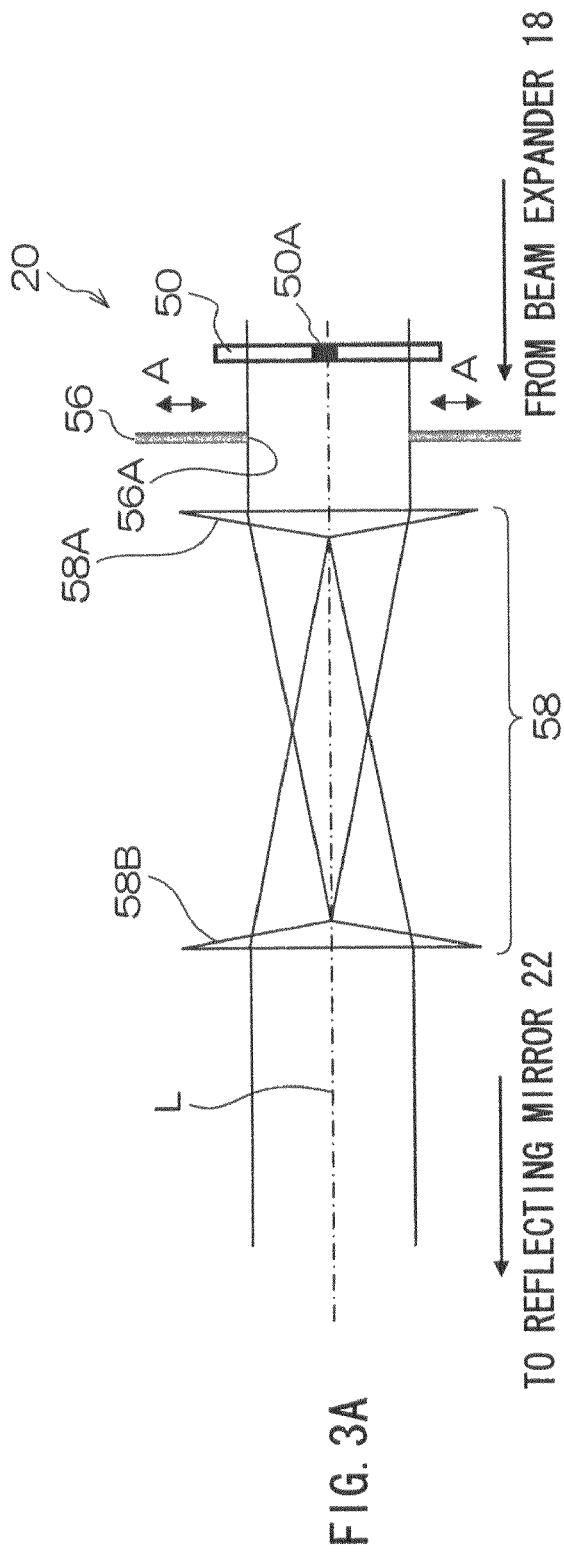
FIG. 3A is a schematic diagram showing an example of the configuration of an axicon optical system.

Next, the configuration of the axicon optical system 20 will be described. FIG. 3A is a schematic diagram showing an example of the configuration of the axicon optical system 20. The axicon optical system 20 is configured to include a mask 50 that comprises a light transmitting plate and includes a blocking portion 50A that blocks light in the vicinity of an optical axis L, a diaphragm mechanism (an iris) 56 that includes an opening portion 56A whose diameter changes to adjust the beam diameter of the light that passes therethrough, and a pair of axicon lenses 58. Laser light is made incident on the axicon optical system 20 from the beam expander 18. The mask 50, the diaphragm mechanism 56 and the pair of axicon lenses 58 are disposed in this order along the optical path from the laser light incident side.

Figure 3C:
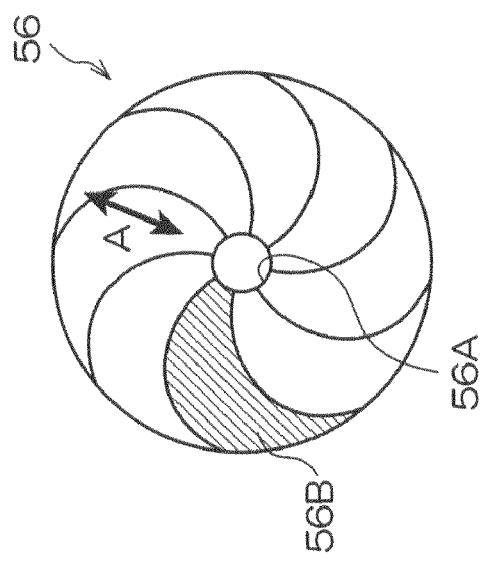
FIG. 3B and FIG. 3C are schematic diagrams showing an example of a diaphragm mechanism.
Figure 3B:
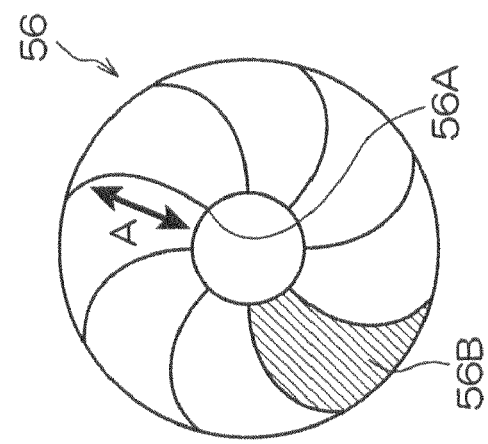

The diaphragm mechanism 56 can, as shown in FIG. 3B and FIG. 3C, for example, be configured by superimposing plural plates (aperture blades) 56B. Each of the plural aperture blades 56B changes the diameter of the opening portion 56A by fixing and simultaneously rotating one end. As shown in FIG. 3B, during recording, in a state where the diameter of the opening portion 56A has expanded, light with a large opening diameter is allowed to pass therethrough. On the other hand, as shown in FIG. 3C, during reproduction, the diameter of the opening portion 56A contracts toward the optical axis from the outside along the direction of arrow A such that the beam diameter of the light that passes through the opening portion 56A becomes smaller. It will be noted that, when an automatic diaphragm mechanism or the like that uses an ultrasonic motor is used as the diaphragm mechanism 56, high-speed driving becomes possible.

Figure 7:
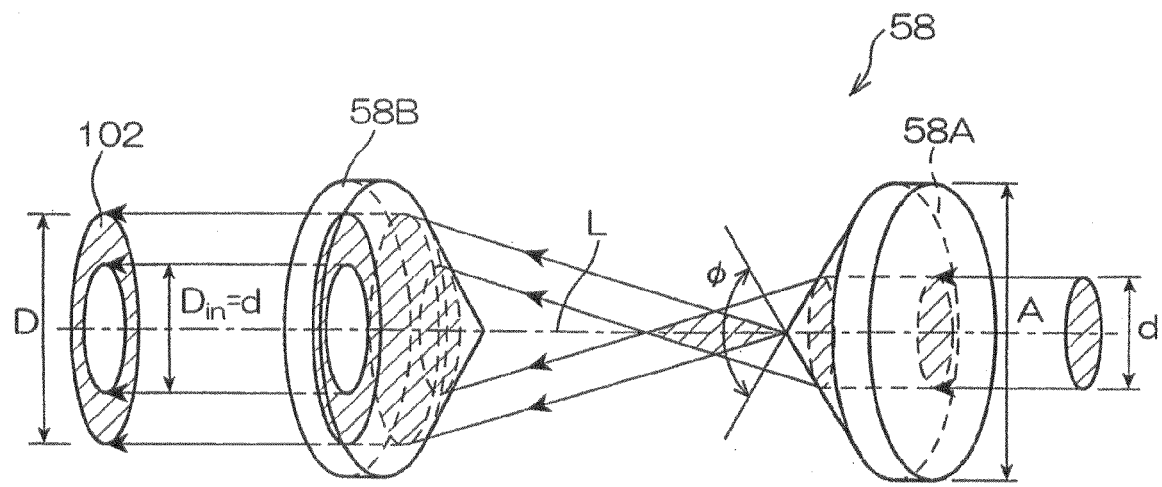
FIG. 7 is a diagram showing the arrangement of the respective lenses that configure the pair of axicon lenses.

FIG. 7 is a diagram showing the arrangement of the respective lenses that configure the pair of axicon lenses 58. The pair of axicon lenses 58 are configured by two lenses that have the same shape: an axicon lens 58A and an axicon lens 58B. An axicon is an optical device that is disposed with an axisymmetric surface that converts light from a point light source into a linear image on an optical axis. There are many instances where an axicon is used in the configuration of a conical lens that is disposed with a conical surface, and a truncated cone-shaped lens where one surface is a flat surface and the other surface is a conical surface is usually called an axicon lens. In the present exemplary embodiment also, the truncated cone-shaped lenses shown in FIG. 7 are called axicon lenses. The axicon lens 58A and the axicon lens 58B are disposed apart from each other by a predetermined distance such that their conical axes coincide with the optical axis L (i.e., such that each of the apexes of the cones is positioned on the same optical axis) and such that their conical surfaces face each other. The distance by which the axicon lens 58A and the axicon lens 58B are disposed apart from each other will be described in detail later.

Beam Correction Operation of Axicon Optical System

Figure 4A:
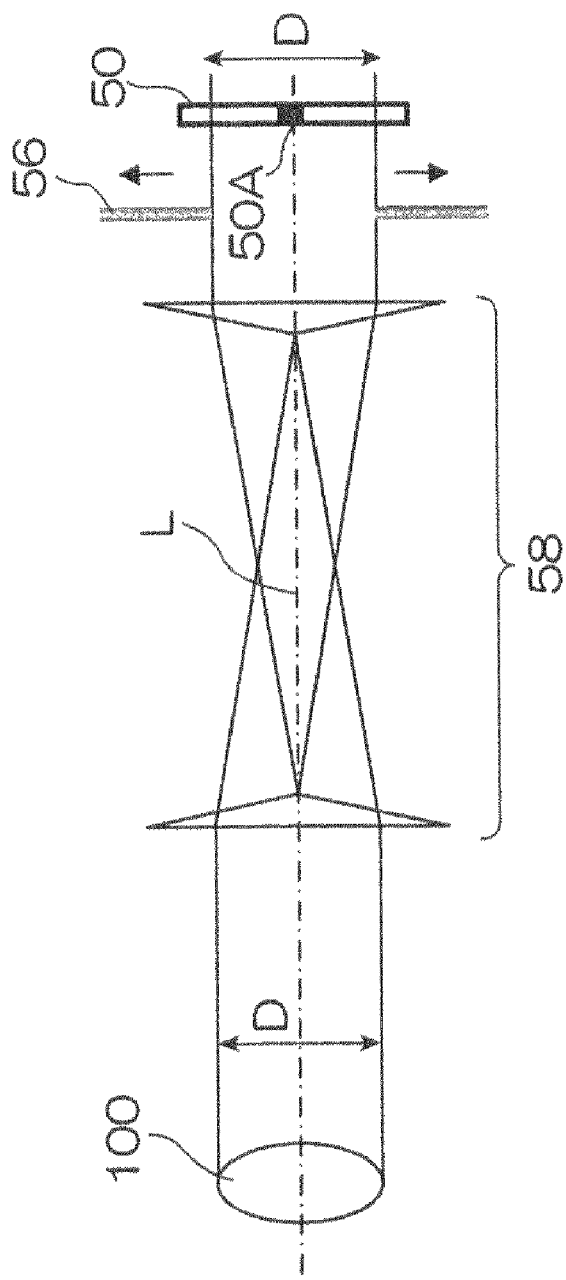
FIG. 4A is a diagram showing beam correction operation of the axicon optical system during recording.
Figure 4B:
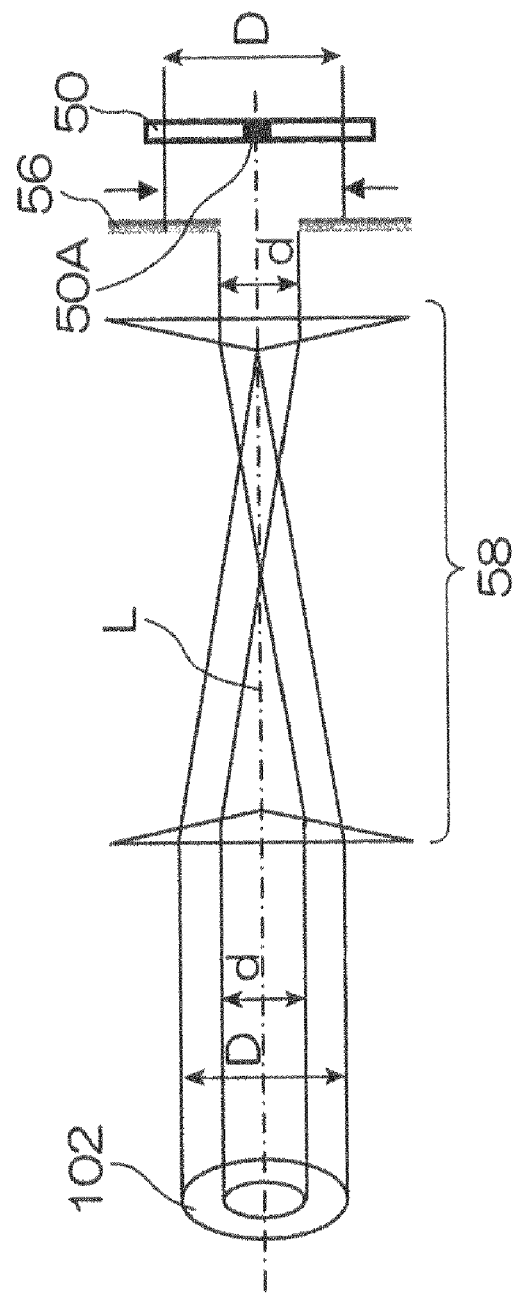
FIG. 4B is a diagram showing beam correction operation of the axicon optical system during reproduction.

Next, operation of the axicon optical system 20 shown in FIG. 3A will be described. FIG. 4A is a diagram showing beam correction operation of the axicon optical system 20 during recording, and FIG. 4B is a diagram showing beam correction operation of the axicon optical system 20 during reproduction.

First, beam correction operation during recording will be described. As shown in FIG. 4A, on the axicon optical system 20, circular parallel light with a diameter D is made incident from the beam expander 18. The mask 50 that includes the blocking portion 50A is irradiated with this circular parallel light with the diameter D. As for the parallel light with which the mask 50 has been irradiated, the light intensity component that would be transmitted through the apexes of the axicon lenses 58A and 58B and travel straightly is removed by the blocking portion 50A, and the remaining portion passes through the mask 50. The diaphragm mechanism 56 is irradiated with the parallel light that has passed through the mask 50. During recording, the diameter of the opening portion 56A in the diaphragm mechanism 56 is in an expanded state. The circular parallel light with the diameter D passes as is through the opening portion 56A.

The light intensity distribution of the circular parallel light with the diameter D that has passed through the opening portion 56A in the diaphragm mechanism 56 is flattened by the axicon lenses 58, and the circular parallel light with the diameter D is emitted as circular parallel light 100 with the same diameter D. That is, when the circular parallel light with the diameter D is made incident from the flat surface side of the axicon lens 58A, when the incident light is emitted from the slanted surface and the apex of the conical surface, it is refracted as in FIG. 4A and a circular beam is formed. The circular beam is made incident from the conical surface of the axicon lens 58B, is formed into the circular parallel light 100 with the diameter D, and is emitted from the flat surface side of the axicon lens 58B. That is, it fulfills the role of folding back the light in the vicinity of the optical axis of the incident light to the outside and of folding back the light in the vicinity of the circumference to the vicinity of the optical axis. Laser light has a Gaussian intensity distribution that has a peak on its optical axis, so by spreading the light in the vicinity of the optical axis where its intensity is high to the outside and causing the light in the vicinity of the circumference where its intensity is low to be concentrated in the vicinity of the optical axis, it becomes possible to make the light intensity distribution uniform.

In the present exemplary embodiment, the diameter D of the circular parallel light 100 is designed so as to become equal to the outer diameter of the reference light region 26R. Thus, the signal light region 26S and the reference light region 26R shown in FIG. 2B are exactly irradiated with the circular parallel light 100.

Next, beam correction operation during reproduction will be described. As shown in FIG. 4B, the mask 50 that includes the blocking portion 50A is irradiated with the circular parallel light with the diameter D that has been made incident on the axicon optical system 20. As for the parallel light with which the mask 50 has been irradiated, the light intensity component that would be transmitted through the apexes of the axicon lenses 58A and 58B and travel straightly is removed by the blocking portion 50A, and the remaining portion passes through the mask 50. The diaphragm mechanism 56 is irradiated with the parallel light that has passed through the mask 50. During reproduction, the diameter of the opening portion 56A in the diaphragm mechanism 56 contracts. The diameter of the opening portion 56A at this time is d (<D). The outside of the circular parallel light with the diameter D with which the diaphragm mechanism 56 has been irradiated is cut by the diaphragm mechanism 56 such that just circular parallel light with the diameter d passes through the opening portion 56A.

The circular parallel light with the diameter d that has passed through the opening portion 56A in the diaphragm mechanism 56 is converted from a circular beam into a ring-shaped beam by the pair of axicon lenses 58 such that ring-shaped parallel light 102 is emitted. As shown also in FIG. 7, when the circular parallel light with the diameter d is made incident from the flat surface side of the axicon lens 58A, when the incident light is emitted from the slanted surface and the apex of the conical surface, it is refracted as in FIG. 4B and a ring-shaped beam is formed. The ring-shaped beam is made incident from the conical surface of the axicon lens 58B, is formed into the ring-shaped parallel light 102, and is emitted from the flat surface side of the axicon lens 58B.

The outer diameter (diameter of the outer circumference) of the ring-shaped parallel light 102 that is emitted is D, and the inner diameter (diameter of the inner circumference) of the ring-shaped parallel light 102 that is emitted is $D_{in}$ (see FIG. 7). The outer diameter D and the inner diameter $D_{in}$ are determined in accordance with the diameter d of the incident parallel light, a diameter A of the axicon lenses, an angle φ of the apex angle of the conical portions and a distance L by which the pair of axicon lenses are disposed apart from each other. The distance L by which the pair of axicon lenses are disposed apart from each other will be described later.

In the present exemplary embodiment, the outer diameter D and the inner diameter $D_{in}$ of the ring-shaped parallel light 102 are designed such that the outer diameter D becomes equal to the outer diameter of the reference light region 26R and such that the inner diameter $D_{in}$ becomes equal to the inner diameter of the reference light region 26R. Thus, the reference light region 26R shown in FIG. 2B is exactly irradiated with the ring-shaped parallel light 102.

It will be noted that, in the present exemplary embodiment, the inner diameter of the reference light region 26R and the diameter of the signal light region 26S are described as being equal, but from the standpoint of reducing leak light that leaks to the region that corresponds to the signal light during reproduction, it is preferable to make the inner diameter of the reference light region 26R larger than the diameter of the signal light region 26S. That is, it is preferable to dispose a gap between the reference light region 26R and the signal light region 26S. Further, from the same standpoint, it is more preferable to make the inner diameter $D_{in}$ of the ring-shaped parallel light 102 slightly larger than the inner diameter of the reference light region 26R.

Figure 5A:
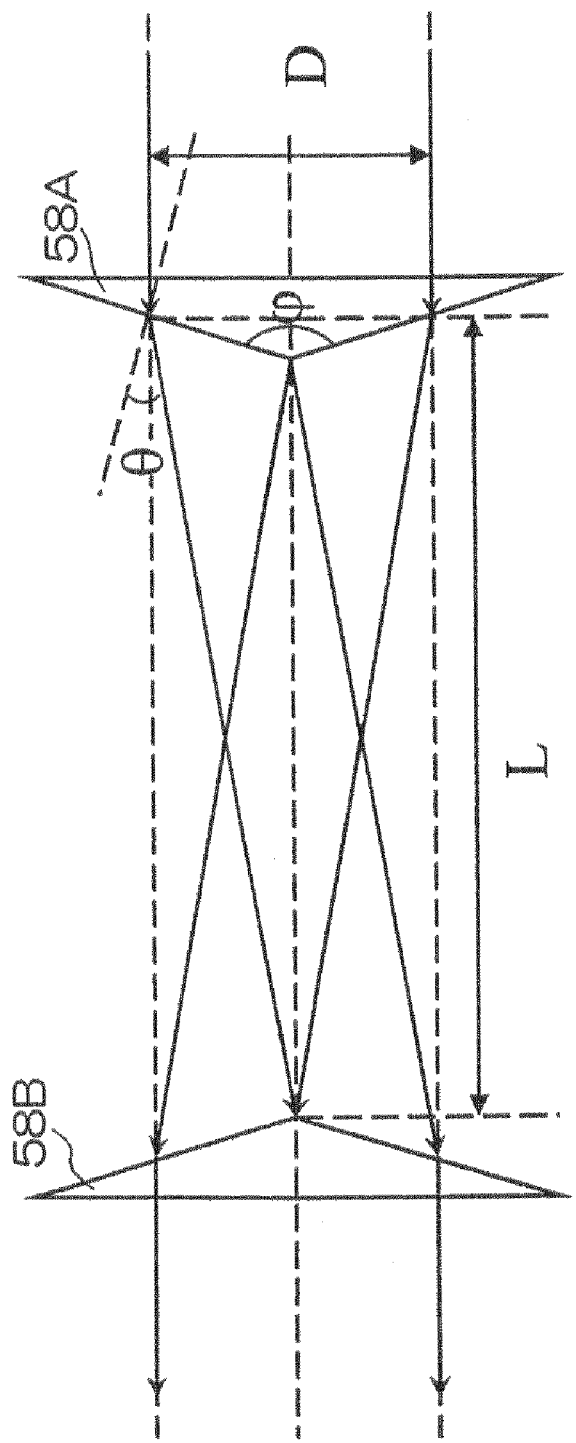
FIG. 5A is a diagram for describing an optical condition where circular incident parallel light with a diameter D is emitted as circular parallel light with the diameter D.

FIG. 5A is a diagram for describing an optical condition for the circular incident parallel light with the diameter D to be emitted as circular parallel light with the same diameter D as shown in FIG. 4A. As shown in FIG. 5A, the distance L by which the axicon lens 58A and the axicon lens 58B are disposed apart from each other is defined as an optical path component distance of the optical path length between the axicon lens 58A and the axicon lens 58B.

Assuming that φ represents the angle of the apex angle of the axicon lenses, D represents the beam diameter of the incident light, D represents the beam diameter of the light that exits, and θ represents the angle of refraction resulting from the axicon lenses, then the distance L by which the axicon lenses are disposed apart from each other is expressed by the following expression.

$$L = \frac{D}{2\tan\left(\theta - \frac{\pi - \varphi}{2}\right)}$$

Assuming that n represents the index of refraction of the axicon lenses and that 1 represents the index of refraction in air, then the relationship of the following expression is established from Snell's law.

$$n\sin\left(\frac{\pi - \varphi}{2}\right) = \sin\theta$$

From the above expressions, in order for the circular parallel light with the diameter D that has been made incident on the axicon lens 56A to be emitted as circular parallel light with the same diameter D from the axicon lens 58B, it is necessary for the axicon lens 58A and the axicon lens 58B to be disposed apart from each other by the distance L that is expressed by the following expression (1).

$$L = \frac{D}{2\tan\left[\sin^{-1}\left\{n\sin\left(\frac{\pi - \varphi}{2}\right)\right\} - \frac{\pi - \varphi}{2}\right]}$$

Figure 5B:
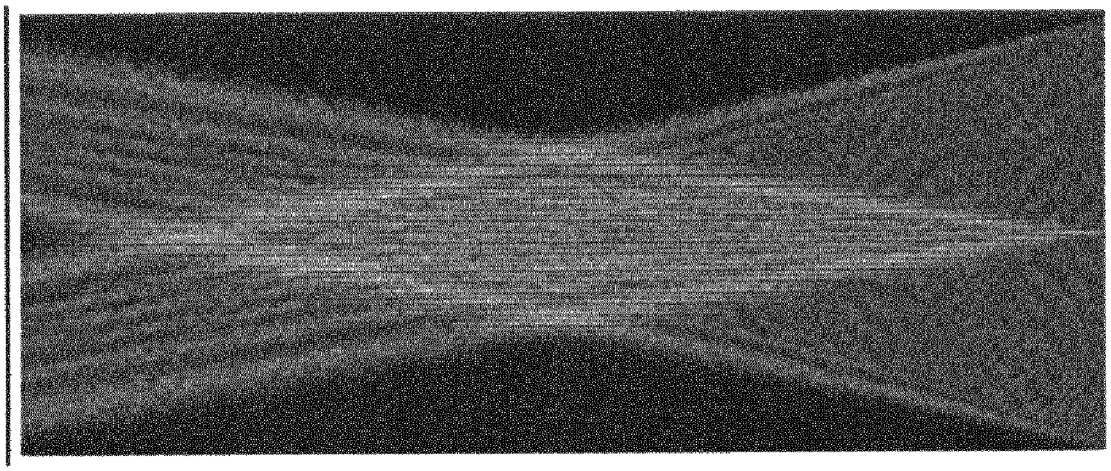
FIG. 5B is a diagram showing a result of simulating a light intensity distribution being flattened by a pair of axicon lenses.
Figure 5B:

Further, FIG. 5B is a diagram showing a result of simulating incident light being refracted by the pair of axicon lenses 58 with a wave-optics technique. Arrow B represents the waveguide direction of the light. As shown in FIG. 5B, it will be understood that, in incident parallel light having a Gaussian intensity distribution, the light in the vicinity of the optical axis is folded back in the outside circumference direction and the light in the vicinity of the circumference is folded back in the vicinity of the optical axis. Thus, the light intensity distribution is converted while the parallel light passes through the pair of axicon lenses 58, and parallel light is generated whose light intensity distribution in its cross section that is orthogonal to the optical axis is uniform.

FIG. 6A to FIG. 6D are diagrams showing results when the effect of flattening the light intensity distribution by the pair of axicon lenses has been simulated with a wave-optics technique. Here, the axicon lens 58A and the axicon lens 58B are disposed apart from each other by the distance L so as to satisfy the above expression. Further, the above-described mask 50 is not used.

Figure 6A:
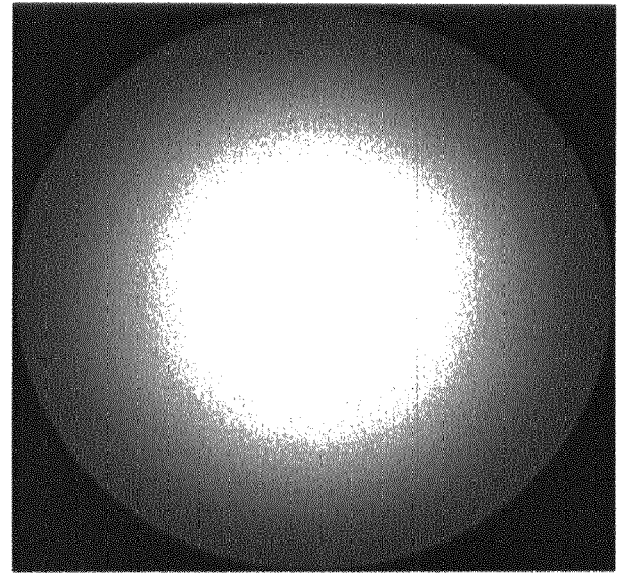
FIG. 6A to FIG. 6D are diagrams showing results when the effect of flattening the light intensity distribution by the pair of axicon lenses has been simulated.
Figure 6B:
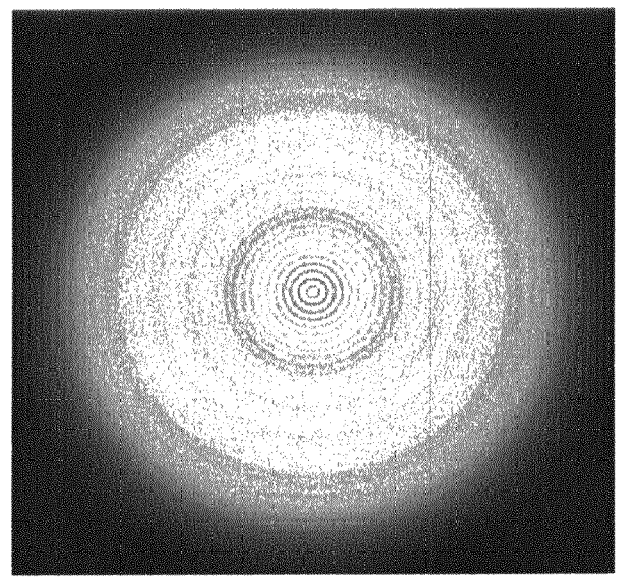
Figure 6C:
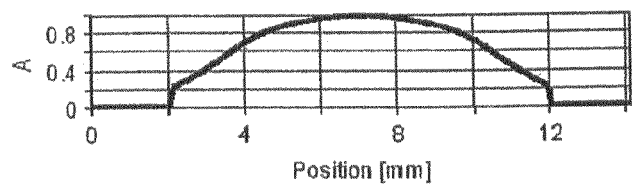
Figure 6D:
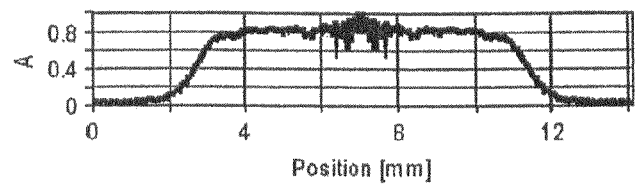

FIG. 6A and FIG. 6C are diagrams showing the beam profile of the parallel light before being made incident on the pair of axicon lenses 58. FIG. 6B and FIG. 6D are diagrams showing the beam profile of the parallel light that has been emitted from the pair of axicon lenses 58. In FIG. 6C and FIG. 6D, the horizontal axis represents distance (unit: mm) from a standard position, and the optical axis is in a position of 7 mm from the standard position. The vertical axis represents a relative light intensity A when a maximum light intensity is 1.

As shown in FIG. 6A and FIG. 6C, in the beam that has a Gaussian intensity distribution, the light intensity in the central portion (in the vicinity of the optical axis) is large, and the light intensity decreases toward the periphery. In contrast, in the beam that has passed through the pair of axicon lenses 58, as shown in FIG. 6B and FIG. 6D, the light intensity in the central portion is distributed to the peripheral portion, the light intensity at the peripheral portion increases, and the light intensities are substantially the same between the central portion and the peripheral portion. The beam profile shown in FIG. 6D has a substantially trapezoidal shape. That is, as a result of passing through the pair of axicon lenses 58, the beam that has a Gaussian intensity distribution is converted into a beam whose light intensity is flattened and whose light intensity distribution in its cross section that is orthogonal to the optical axis is uniform.

However, as will be understood from FIG. 6B and FIG. 6D, when the light intensity distribution is simply flattened using the pair of axicon lenses 58, turbulence in the light intensity distribution arises in the central portion even after the light intensity distribution has been flattened. The cause of this is diffraction at the apexes of the axicon lenses. Consequently, as mentioned above, the mask 50 that includes the blocking portion 50A is disposed on the light incident side of the pair of axicon lenses 58 to thereby block the light intensity component that would be transmitted through the apexes of the axicon lenses 58 and travel straightly. Thus, the turbulence in the light intensity distribution is removed at the central portion, and the light intensity distribution is made even more uniform. However, the mask 50 can also be appropriately omitted by a contrivance such as not using the signal light region in the vicinity of the center where the light intensity distribution becomes turbulent. It will be noted that the conditional expression in the present invention has been described by a case where the mask 50 is omitted. When the mask 50 is introduced, the conditional expression may be appropriately corrected in accordance with the size of the blocking portion 50A.

As described above, during recording, the axicon optical system 20 generates the circular parallel light 100 with the diameter D whose light intensity distribution has been flattened in order to irradiate, with laser light, the circular recording region that includes the signal light region 26S and the reference light region 26R shown in FIG. 2B. Further, during reproduction, the axicon optical system 20 generates ring-shaped parallel light in order to irradiate, with laser light, just the ring-shaped reference light region 26R of the spatial light modulator 26. That is, during reproduction, the axicon optical system 20 generates ring-shaped parallel light such that the signal light region 26S of the spatial light modulator 26 is not irradiated with laser light.

It will be noted that the parallel light generated by the axicon optical system 20 is, as mentioned later, reflected by the reflecting mirror 22 and reflected by the polarizing beam splitter 24 such that the spatial light modulator 26 is irradiated therewith. At this time, as mentioned above, during recording, the signal light region 26S and the reference light region 26R are irradiated with the circular parallel light 100 and, during reproduction, the reference light region 26R is irradiated with the ring-shaped parallel light 102.

Recording/Reproduction Operation of Optical Recording and Reproduction Device

Next, operation of recording/reproduction of the optical recording and reproduction device shown in FIG. 1 will be described.

When a hologram is to be recorded, the shutter 12 is opened and laser light is emitted from the light source 10. At the same time, a recording pattern is displayed on the spatial light modulator 26. The laser light that has been emitted from the light source 10 passes through the shutter 12, and its light intensity and polarization direction are adjusted by the ½ wavelength plate 14 and the polarizing plate 16. For example, the polarizing plate 16 has an arrangement that transmits only S-polarized light, and the polarization direction of the laser light is controlled by the ½ wavelength plate 14, whereby the light intensity of the S-polarized light is adjusted. The light that has passed through the polarizing plate 16 is converted into parallel light with a large diameter by the beam expander 18, and circular parallel light with the diameter D is made incident on the axicon optical system 20.

In the axicon optical system 20, the circular incident parallel light with the diameter D is corrected, and the circular parallel light 100 with the diameter D whose light intensity distribution has been flattened is generated. The reflecting mirror 22 is irradiated with the parallel light that has been emitted from the axicon optical system 20. The parallel light that has been reflected by the reflecting mirror 22 is made incident on the polarizing beam splitter 24. Here, the polarizing beam splitter 24 reflects S-polarized light and transmits P-polarized light. The circular parallel light 100 with the diameter D (S-polarized light) is reflected by the polarizing beam splitter 24 in the direction of the spatial light modulator 26. On the spatial light modulator 26, the recording pattern is displayed. In the spatial light modulator 26, the laser light is polarized and modulated (from S-polarized light to P-polarized light) in accordance with the displayed pattern, and signal light and reference light are generated.

Figure 8A:
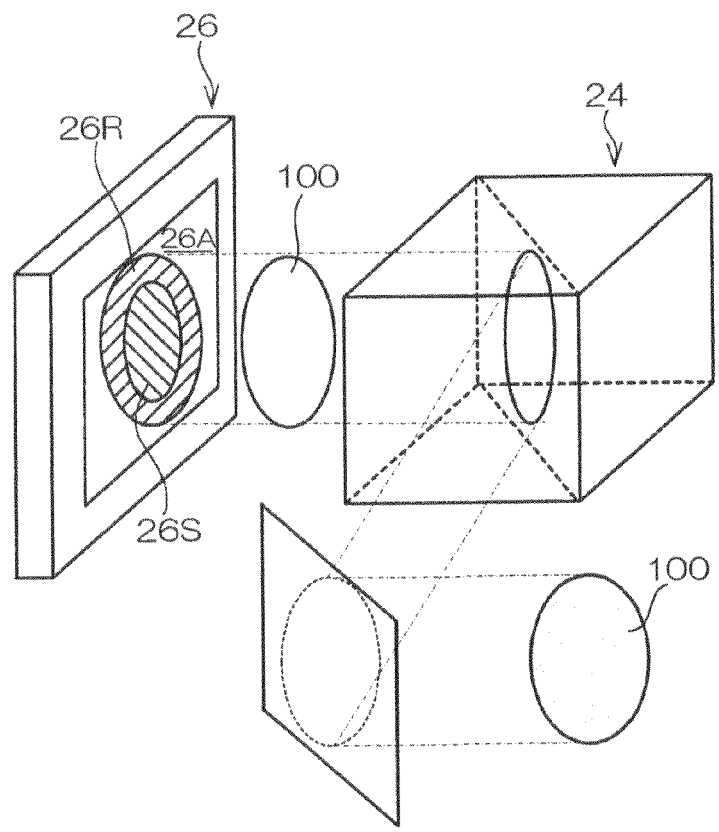
FIG. 8A is a perspective diagram showing the display surface of the spatial light modulator being irradiated with laser light during recording.

In the present exemplary embodiment, as shown in FIG. 8A, the signal light region 26S and the reference light region 26R of the spatial light modulator 26 are irradiated with the circular parallel light 100 generated by the axicon optical system 20. The laser light that has been made incident on the signal light region 26S is polarized and modulated in accordance with the displayed signal light pattern, and signal light is generated. Further, the laser light that has been made incident on the reference light region 26R is polarized and modulated in accordance with the displayed reference light pattern, and reference light is generated. Because the light intensity distribution of the circular parallel light 100 is flattened, the recording pattern that is displayed on the spatial light modulator 26 can be irradiated uniformly. Thus, the SNR of the signal light that is generated improves, and a hologram is recorded in a high SNR.

The recording light that has been polarized and modulated by the spatial light modulator 26 is emitted to the polarizing beam splitter 24, passes through the polarizing beam splitter 24, and is converted into an amplitude distribution of linearly polarized light (P-polarized light). Thereafter, the recording light is collected by the lens 28, and the light blocking plate 30 that includes the aperture 30A is irradiated therewith. The unnecessary frequency component of the recording light that has been collected by the lens 28 is cut by the light blocking plate 30, and the remaining portion passes through the aperture 30A. The recording light that has passed through the aperture 30A is converted into parallel light by the lens 32.

The recording light that has been converted into parallel light by the lens 32, that is, the signal light and the reference light are Fourier-transformed and collected by the Fourier transform lens 34, and the optical recording medium 36 is simultaneously and coaxially irradiated therewith. In the position where the signal light and the reference light are collected, an interference fringe that is formed as a result of the signal light and the reference light interfering with each other is recorded as a hologram on the optical recording medium 36.

When data that have been recorded on the optical recording medium 36 are to be read (during reproduction), the shutter 12 is opened and laser light is emitted from the light source. At the same time, a reproduction pattern is displayed on the spatial light modulator 26. The laser light that has been emitted from the light source 10, in the same manner as in the case of recording, passes through the shutter 12, its light intensity and polarization direction are adjusted by the ½ wavelength plate 14 and the polarizing plate 16, it is converted into parallel light with a large diameter by the beam expander 18, and it is made incident on the axicon optical system 20.

In the axicon optical system 20, the circular incident parallel light with the diameter D is corrected, and the ring-shaped parallel light 102 with the outer diameter D and the inner diameter d is generated. The light intensity distribution of the ring-shaped parallel light 102 is also flattened. The reflecting mirror 22 is irradiated with the ring-shaped parallel light 102 that has been emitted from the axicon optical system 20. The ring-shaped parallel light 102 that has been reflected by the reflecting mirror 22 is made incident on the polarizing beam splitter 24. The ring-shaped incident parallel light 102 (S-polarized light) is reflected by the polarizing beam splitter 24 in the direction of the spatial light modulator 26. On the spatial light modulator 26, the reproduction pattern is displayed. In the spatial light modulator 26, the laser light is polarized and modulated (from S-polarized light to P-polarized light) in accordance with the displayed pattern, and reference light is generated.

Figure 8B:
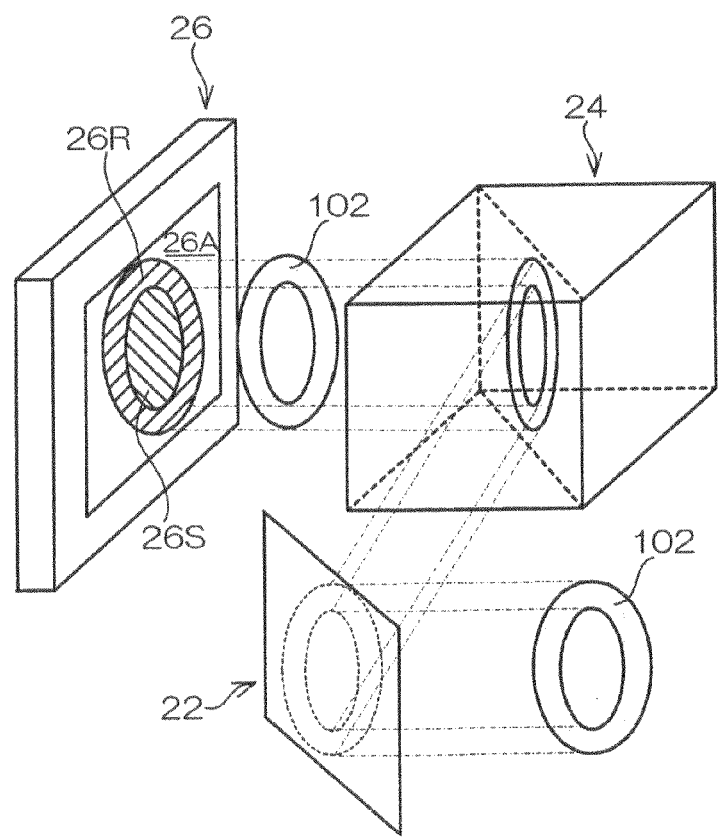
FIG. 8B is a perspective diagram showing the display surface of the spatial light modulator being irradiated with laser light during reproduction.

In the present exemplary embodiment, as shown in FIG. 8B, the reference light region 26R of the spatial light modulator 26 is irradiated with the ring-shaped parallel light 102 that has been generated by the axicon optical system 20. The laser light that has been made incident on the reference light region 26R is polarized and modulated in accordance with the displayed reference light pattern, and reference light is generated. The region of the optical recording medium 36 on which the hologram has been recorded is, in the same manner as in the case of recording, irradiated with the generated reference light that. That is, the optical recording medium 36 is irradiated with just the reference light as reading light.

The ring-shaped parallel light 102 is generated in accordance with the shape of the reference light region 26R, just the reference light region 26R is irradiated with the laser light, and the signal light region 26S is not irradiated with the laser light. Consequently, the optical recording medium 36 is not irradiated with the light that has been reflected by the signal light region 26S (leak light that is present in the region that corresponds to the signal light) together with the reference light for reading. Consequently, in the reading light with which the hologram is irradiated, leak light (unnecessary component) that leaks to the region that corresponds to the signal light is significantly reduced and reproduction characteristics remarkably improve.

When the reference light with which the optical recording medium 36 has been irradiated passes through the optical recording medium 36, it is diffracted by the hologram, and the transmitted diffracted light (reproduced light) is emitted toward the Fourier transform lens 38. Some of the reference light is transmitted through the optical recording medium 36 without being diffracted. The emitted reproduced light (including the transmitted diffracted light) is inverse-Fourier-transformed by the Fourier transform lens 38, and the light blocking plate 40 that includes the aperture 40A is irradiated therewith. As for the reproduced light that has been inverse-Fourier-transformed by the lens 38, the transmitted reference light is cut by the light blocking plate 40 and the remaining portion passes through the aperture 40A. The light that has passed through the aperture 40A is relayed by the pair of lenses 42 and 44 and is made incident on the sensor array 46.

The sensor array 46 converts the reproduced light that has been received into electrical signals and outputs the electrical signals. That is, the sensor array 46 reads the data that have been superposed on the reproduced signal light and outputs the data to a control device (not shown). It will be noted that, in the sensor array 46, it is preferable to implement oversampling where one pixel of the signal light data is received by plural light receiving elements. For example, data of 1 bit are received by four (2×2) light receiving elements.

Experimental Results

Figure 9A:
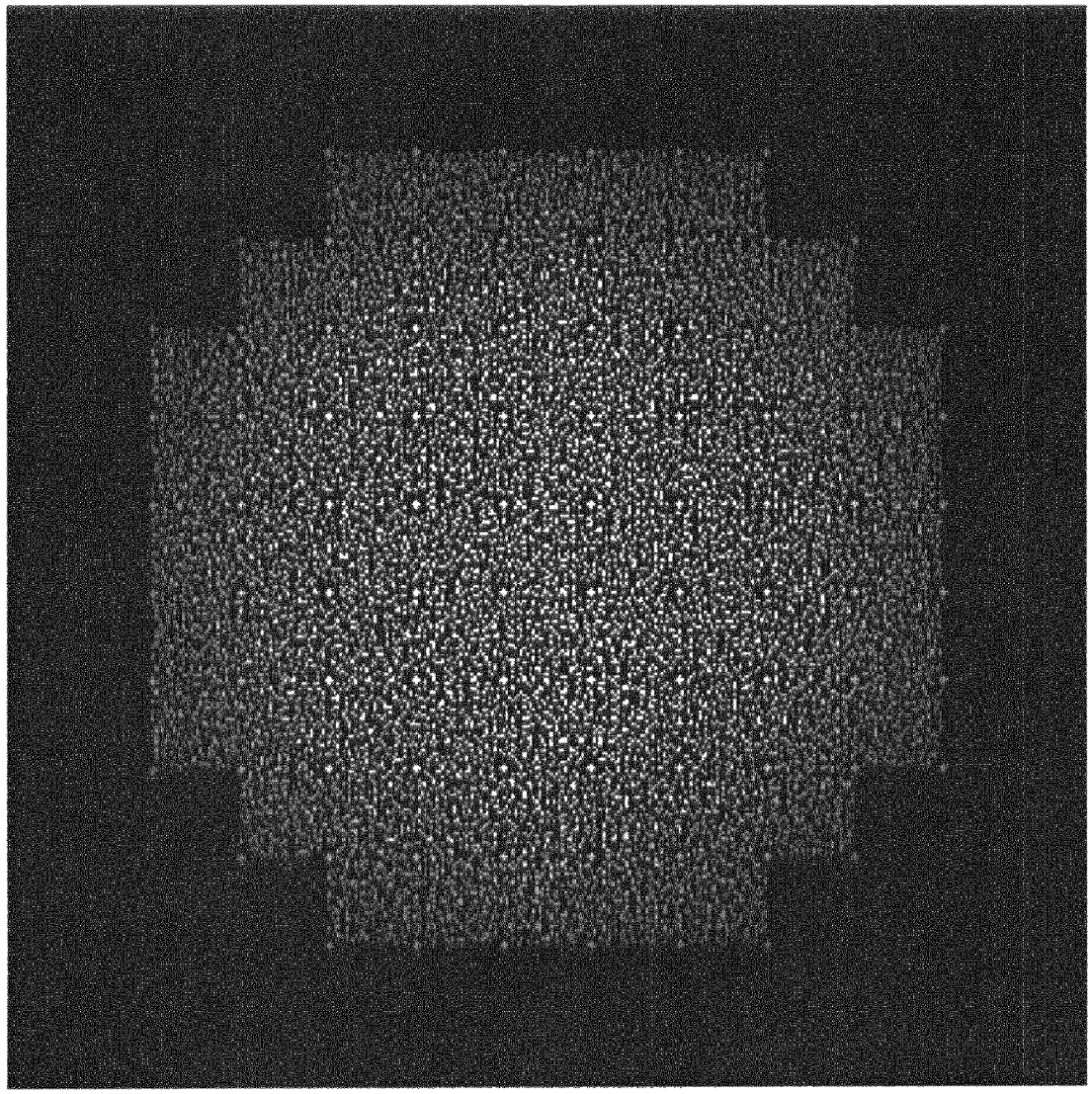
FIG. 9A and FIG. 9B are diagrams showing the effect of introducing the axicon optical system.
Figure 9B:
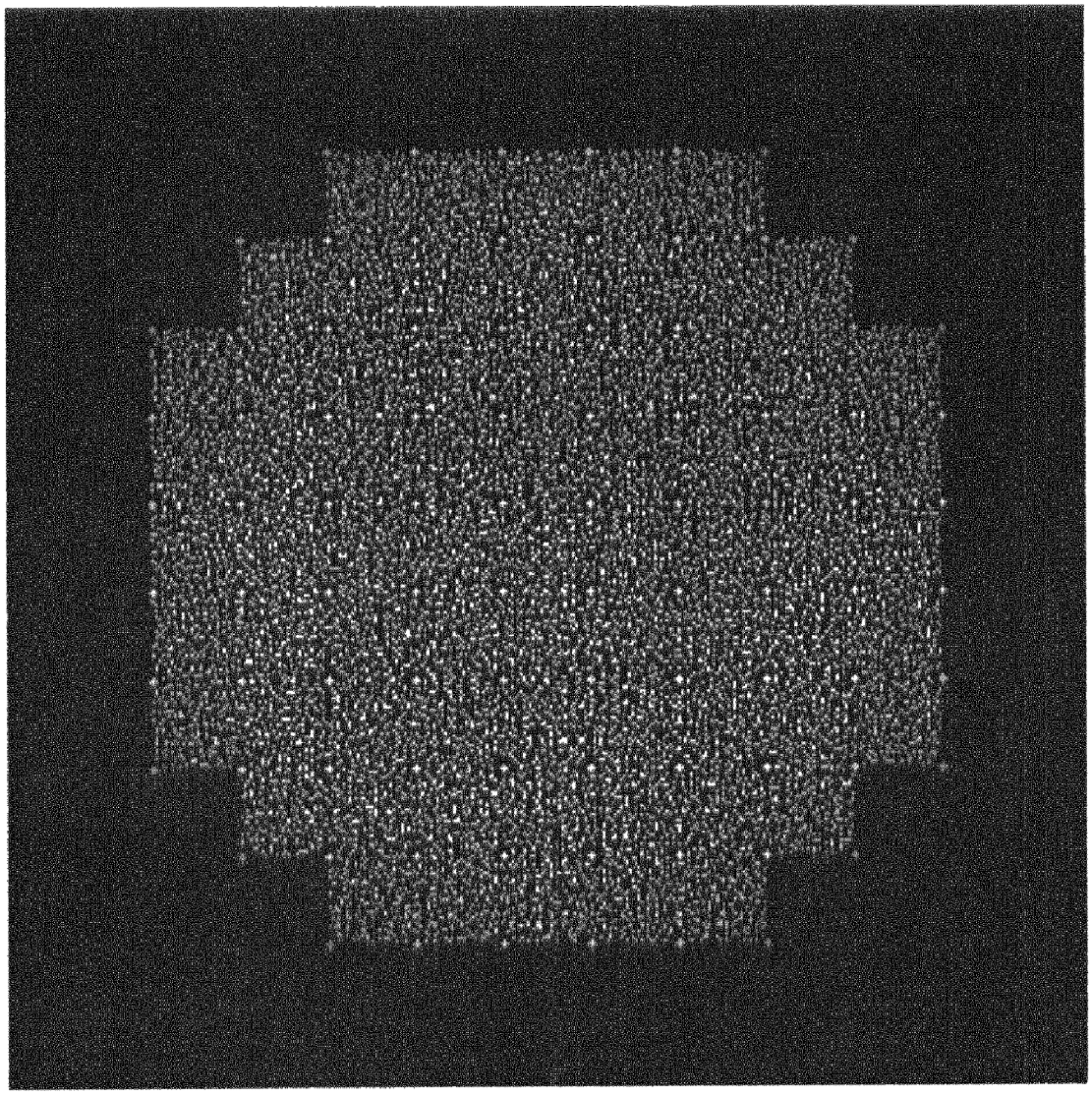

FIG. 9A and FIG. 9B are diagrams showing the effect of introducing the axicon optical system. FIG. 9A is a diagram showing a result when the light intensity distribution of signal light (a data page) observed on the display surface 26A of the spatial light modulator 26 has been simulated in a case where there is used an optical recording and reproduction device with the same configuration as has conventionally been the case excluding the axicon optical system from the configuration shown in FIG. 1 (below, called "the conventional device"). FIG. 9B is a diagram showing a result when the light intensity distribution of a data page observed on the display surface 26A of the spatial light modulator 26 has been simulated in a case where there is used an optical recording and reproduction device with the same configuration as the configuration shown in FIG. 1 (below, called "the device to which the axicon optical system has been introduced"). That is, the light intensity distributions of the data pages shown in FIG. 9A and FIG. 9B were obtained by multiplying the light intensity distributions shown in FIG. 6A and FIG. 6B that have been obtained by simulation and the intensity distribution of an ideal data pattern.

As will be understood from FIG. 9A, in the conventional device to which the axicon optical system was not introduced, the spatial light modulator is irradiated with the laser light with the Gaussian intensity distribution shown in FIG. 6A, so the central portion of the data page observed is bright but the peripheral portion is dark. In contrast, as will be understood from FIG. 9B, in the device to which the axicon optical system has been introduced, the spatial light modulator is irradiated with the laser light with the flattened light intensity distribution shown in FIG. 6B, so a data page with uniform brightness is observed. Thus, in the device to which the axicon optical system has been introduced, the spatial light modulator is uniformly irradiated with the signal light pattern that is displayed on the spatial light modulator 26, signal light (a data page) with a high SNR is generated.

Figure 10B:
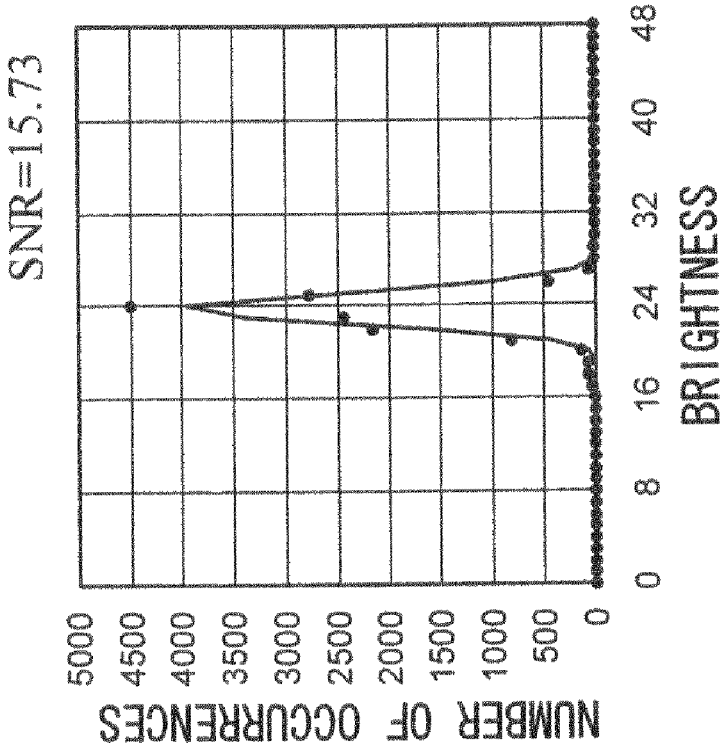
FIG. 10B is a histogram of ON pixels of a data page shown in FIG. 9B.
Figure 10A:
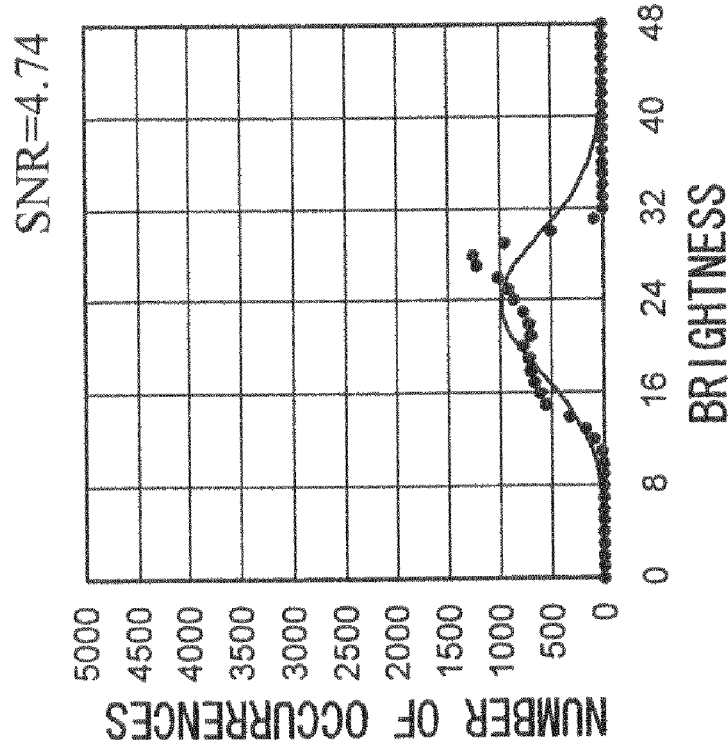
FIG. 10A is a histogram of ON pixels (white pixels) of a data page shown in FIG. 9A.

FIG. 10A is a histogram of ON pixels (white pixels) of the data page shown in FIG. 9A, and FIG. 10B is a histogram of ON pixels of the data page shown in FIG. 9B. The horizontal axes represent brightness (in arbitrary units), and the vertical axes represent the number of occurrences (units: number of times) of ON pixels within the data pages. These histograms were obtained from the above-described simulation results.

As shown in FIG. 10A, in the data page that was obtained in the conventional device, the brightness of the ON pixels distributes in the range of 8 to 40, and the SNR of the data page is 4.75. In contrast, as shown in FIG. 10B, in the data page that was obtained in the device to which the axicon optical system has been introduced, the SNR of the data page improves to 15.73, or greater than 3 times the SNR of the data page that was obtained in the conventional device. The fact that the range of the brightness distribution of the ON pixels is narrow means that the brightness of the ON pixels is substantially constant within the data page and that the light intensity distribution is flattened. Thus, it is apparent that, in the device to which the axicon optical system has been introduced, signal light (a data page) with a high SNR is generated. It will be noted that, here, SNR is defined as being equal to: (average value of brightness)/(standard deviation of brightness).

Further, as mentioned above, in the conventional device, during reproduction also, the signal light region 26S and the reference light region 26R of the spatial light modulator 26 are irradiated with laser light. In contrast, in the device to which the axicon optical system has been introduced, just the reference light region 26R of the spatial light modulator 26 is irradiated with laser light.

Further, the minimum diffraction efficiency was evaluated using the diffraction efficiency when the bit error rate (BER) is equal to $5 \times 10^{-3}$ as a minimum diffraction efficiency that is capable of being reproduced. The smaller the value that the minimum diffraction efficiency is, a hologram with a low diffraction efficiency can be reproduced in an excellent SNR, and reproduction characteristics improve. That is, because it is possible to reduce the recording energy of the hologram that is to be recorded, it becomes possible to multiply record more holograms, which contributes to an improvement in recording density.

The minimum diffraction efficiency when reproduced by the device to which the axicon optical system has been introduced is 0.1%, and the minimum diffraction efficiency when reproduced by the conventional device is 1.0%. It will be understood that the minimum diffraction efficiency drops from 1.0% to 0.1% and that reproduction characteristics remarkably improve. The evaluations here were performed by simulation images that were obtained by imaging leak light of the signal light region when irradiated with the signal light and computationally adding the obtained images and the images that were obtained by simulation (FIG. 9A and FIG. 9B).

Other Modifications

It will be noted that, in the preceding exemplary embodiment, an example of a "coaxial transmissive" optical recording and reproduction device that uses a reflective spatial light modulator and a transmissive optical recording medium has been described, but the same effects as those of the preceding exemplary embodiment can also be obtained even when the axicon optical system is introduced to a "coaxial reflective" optical recording and reproduction device that uses a reflective spatial light modulator and a reflective optical recording medium. FIG. 11 is a schematic diagram showing the configuration of a coaxial reflective optical recording and reproduction device to which the axicon optical system has been introduced. The same reference numerals will be given to configural portions that are the same as those of the optical recording and reproduction device pertaining to the preceding exemplary embodiment shown in FIG. 1.

In this optical recording and reproduction device, there is disposed the light source 10 that emits laser light. On the light exiting side of the light source 10, the shutter 12, the ½ wavelength plate 14, the polarizing plate 16, the beam expander 18, the axicon optical system 20 and the reflecting mirror 22 are disposed in this order along the optical path from the side of the light source 10. On the light reflecting side of the reflecting mirror 22, there is disposed the polarizing beam splitter 24. When seen from the reflecting mirror 22 side, on the light reflecting side of the polarizing beam splitter 24, there is disposed the reflective spatial light modulator 26. The spatial light modulator 26 modulates incident laser light in accordance with the displayed signal light pattern and reference light pattern to generate signal light and reference light. The spatial light modulator 26 reflects the generated signal light and reference light toward the polarizing beam splitter 24.

The axicon optical system 20 has the same configuration as that of the preceding exemplary embodiment. The axicon optical system 20 is, as shown in FIG. 3A, configured to include the mask 50 that includes the blocking portion 50A, the diaphragm mechanism 56 and the pair of axicon lenses 58. Laser light is made incident on the axicon optical system 20 from the beam expander 18. The mask 50, the diaphragm mechanism 56 and the pair of axicon lenses 58 are disposed in this order along the optical path from the laser light incident side.

On the polarizing beam splitter 24, the signal light and the reference light that have been generated by the spatial light modulator 26 are made incident. When seen from this spatial light modulator 26, on the light transmitting side of the polarizing beam splitter 24, a pair of lenses 84 and 88, a ¼ wavelength plate 90 that converts linearly polarized light into circularly polarized light and which converts circularly polarized light into linearly polarized light and a Fourier transform lens 92 are disposed in this order along the optical path. The Fourier transform lens 92 irradiates a reflective optical recording medium 94 with recording light. The focal position of the Fourier transform lens 92 becomes a light collecting position where the recording light is collected. Between the lens 84 and the lens 88, in the vicinity of the beam waist, there is disposed a light blocking plate 86 that includes an opening portion (an aperture) 86A. It will be noted that the light blocking plate 86 is not essential and can be appropriately omitted.

On the light exiting side of the Fourier transform lens 92, there is disposed a holding stage (not shown) that holds the optical recording medium 94. The optical recording medium 94 is an optical recording medium on which a hologram is capable of being recorded by a change in the index of refraction resulting from being irradiated with light, and the optical recording medium 94 is disposed with a recording layer 94A that is configured by a recording material such as a photopolymer material on which a hologram is capable of being recorded and a reflective layer 94B that is configured by a metal film or the like that reflects light that is transmitted through the recording layer 94A.

When seen from the lens 84, on the light reflecting side of the polarizing beam splitter 24, there is disposed a sensor array 96. The sensor array 96 is configured by imaging elements such as CCDs or a CMOS array, converts reproduced light (diffracted light) that has been received into electrical signals and outputs the electrical signals.

When a hologram is to be recorded, the shutter 12 is opened and laser light is emitted from the light source 10. At the same time, a recording pattern is displayed on the spatial light modulator 26. The laser light that has been emitted from the light source 10 passes through the shutter 12, and its light intensity and polarization direction are adjusted by the ½ wavelength plate 14 and the polarizing plate 16. The light that has passed through the polarizing plate 16 is converted into parallel light with a large diameter by the beam expander 18 and is made incident on the axicon optical system 20.

In the axicon optical system 20, the circular incident parallel light with the diameter D is corrected, and the circular parallel light 100 with the diameter D whose light intensity distribution has been flattened is generated. The reflecting mirror 22 is irradiated with the parallel light that has been emitted from the axicon optical system 20. The parallel light that has been reflected by the reflecting mirror 22 is made incident on the polarizing beam splitter 24. The circular parallel light 100 with the diameter D is reflected by the polarizing beam splitter 24 in the direction of the spatial light modulator 26. In the spatial light modulator 26, the laser light is polarized and modulated in accordance with the displayed pattern, and signal light and reference light are generated.

The recording light that has been polarized and modulated by the spatial light modulator 26 is emitted to the polarizing beam splitter 24, passes through the polarizing beam splitter 24, and is converted into an amplitude distribution of linearly polarized light. Thereafter, the recording light is collected by the lens 84, and the light blocking plate 86 that includes the aperture 86A is irradiated therewith. The unnecessary frequency component of the recording light that has been collected by the lens 84 is cut by the light blocking plate 86, and the remaining portion passes through the aperture 86A. The recording light that has passed through the aperture 86A is converted into parallel light by the lens 88.

The recording light (the signal light and the reference light) that has been converted into parallel light by the lens 88 is converted into circularly polarized light by the ¼ wavelength plate 90 and is Fourier-transformed and collected by the Fourier transform lens 92, and the optical recording medium 94 is simultaneously and coaxially irradiated therewith. In the position where the signal light and the reference light are collected, an interference fringe that is formed as a result of the signal light and the reference light interfering with each other is recorded as a hologram on the optical recording medium 94.

When data that have been recorded on the optical recording medium 94 are to be read, the shutter 12 is opened and laser light is emitted from the light source. At the same time, a reproduction pattern is displayed on the spatial light modulator 26. The laser light that has been emitted from the light source 10, in the same manner as in the case of recording, passes through the shutter 12, its light intensity and polarization direction are adjusted by the ½ wavelength plate 14 and the polarizing plate 16, it is converted into parallel light with a large diameter by the beam expander 18, and it is made incident on the axicon optical system 20.

In the axicon optical system 20, the circular incident parallel light with the diameter D is corrected, and the ring-shaped parallel light 102 with the outer diameter D and the inner diameter d is generated. The light intensity distribution of the ring-shaped parallel light 102 is also flattened. The reflecting mirror 22 is irradiated with the ring-shaped parallel light 102 that has been emitted from the axicon optical system 20. The ring-shaped parallel light 102 that has been reflected by the reflecting mirror 22 is made incident on the polarizing beam splitter 24. The ring-shaped incident parallel light 102 is reflected by the polarizing beam splitter 24 in the direction of the spatial light modulator 26. In the spatial light modulator 26, the laser light is polarized and modulated in accordance with the displayed reproduction pattern, and reference light is generated. The region of the optical recording medium 94 on which the hologram has been recorded is, in the same manner as in the case of recording, irradiated with the generated reference light. That is, the optical recording medium 94 is irradiated with just the reference light as reading light.

The ring-shaped parallel light 102 is generated in accordance with the shape of the reference light region 26R, just the reference light region 26R is irradiated with the laser light, and the signal light region 26S is not irradiated with the laser light. Consequently, the optical recording medium 94 is not irradiated with the light that has been reflected by the signal light region 26S (leak light that is present in the region that corresponds to the signal light) together with the reference light for reading. Consequently, in the reading light with which the hologram is irradiated, leak light (unnecessary component) that leaks to the region that corresponds to the signal light is significantly reduced and reproduction characteristics remarkably improve.

When the reference light with which the optical recording medium 94 has been irradiated passes through the recording layer 94A of the optical recording medium 94, it is diffracted by the hologram and reflected by the reflecting layer 94B, and the transmitted diffracted light (reproduced light) is emitted toward the Fourier transform lens 92. Some of the reference light is reflected by the reflecting layer 94B of the optical recording medium 94 without being diffracted. The emitted reproduced light (including the reflected reference light) is inverse-Fourier-transformed by the Fourier transform lens 92 and is again converted into linearly polarized light by the ¼ wavelength plate 90. The reproduced light that has been converted into linearly polarized light by the ¼ wavelength plate 90 is relayed and converted into parallel light by the pair of lenses 88 and 84, is made incident on the polarizing beam splitter 24, is reflected by the polarizing beam splitter 24, and is made incident on the sensor array 96. The sensor array 96 converts the reproduced light that has been received into electrical signals and outputs the electrical signals.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical recording device comprising:

a light source that emits coherent light;

a spatial light modulator that is formed from a plurality of pixels that are two-dimensionally arrayed, that comprises a signal light region that displays a signal light pattern when generating signal light, and a reference light region that is disposed so as to surround the signal light region and displays a reference light pattern when generating reference light that is coaxial with the signal light, and that modulates and outputs incident light for each pixel in accordance with a display pattern;

a correcting optical system that is disposed between the light source and the spatial light modulator and comprises a pair of axicon lenses that correct the light that has been emitted from the light source so as to flatten the light intensity distribution thereof on an irradiated surface of the spatial light modulator; and a light guiding section that guides the light that has been corrected by the correcting optical system to the spatial light modulator, wherein the signal light and the reference light generated by the spatial light modulator are irradiated onto an optical recording medium simultaneously and a hologram is recorded into the optical recording medium; and wherein the pair of axicon lenses that form the correcting optical system are disposed such that conical surfaces thereof face each other and are disposed apart from each other by a distance L that is defined in the following expression:

$$L = \frac{D}{2\tan\left[\sin^{-1}\left\{n\sin\left(\frac{\pi-\varphi}{2}\right)\right\} - \frac{\pi-\varphi}{2}\right]}$$

wherein, the distance L is an optical axis component distance of an optical path length between the axicon lenses, φ represents the angle of the apex angle of the axicon lenses, D represents the beam diameter of the light incident on the axicon lenses, and n represents the index of refraction of the axicon lenses, with the index of refraction in air being 1.

2. An optical recording device comprising:

a light source that emits coherent light, a spatial light modulator that is formed from a plurality of pixels that are two-dimensionally arrayed, that comprises a signal light region that displays a signal light pattern when generating signal light, and a reference light region that is disposed so as to surround the signal light region and displays a reference light pattern when generating reference light that is coaxial with the signal light, and that modulates and outputs incident light for each pixel in accordance with a display pattern;

a correcting optical system that is disposed between the light source and the spatial light modulator and comprises a pair of axicon lenses that correct the light that has been emitted from the light source so as to flatten the light intensity distribution thereof on an irradiated surface of the spatial light modulator;

a light guiding section that guides the light that has been corrected by the correcting optical system to the spatial light modulator; and a mask that is disposed between the light source and the correcting optical system and comprises a blocking portion that blocks the light in the vicinity of the optical axis, wherein the signal light and the reference light generated by the spatial light modulator are irradiated onto an optical recording medium simultaneously and a hologram is recorded into the optical recording medium; and wherein the pair of axicon lenses that form the correcting optical system are disposed such that conical surfaces thereof face each other and are disposed apart from each other by a distance L that is defined in the following expression:

$$L = \frac{D}{2\tan\left[\sin^{-1}\left\{n\sin\left(\frac{\pi-\varphi}{2}\right)\right\} - \frac{\pi-\varphi}{2}\right]}$$

wherein, the distance L is an optical axis component distance of an optical path length between the axicon lenses, φ represents the angle of the apex angle of the axicon lenses, D represents the beam diameter of the light incident on the axicon lenses, and n represents the index of refraction of the axicon lenses, with the index of refraction in air being 1.

3. An optical recording and reproduction device comprising:

a light source that emits coherent light;

a spatial light modulator that is formed from a plurality of pixels that are two-dimensionally arrayed, that comprises a signal light region that displays a signal light pattern when generating signal light, and a reference light region that is disposed so as to surround the signal light region and displays a reference light pattern when generating reference light that is coaxial with the signal light, and that modulates and outputs incident light for each pixel in accordance with a display pattern;

a diaphragm mechanism that is disposed between the light source and the spatial light modulator and comprises an opening portion whose diameter contracts during reproduction to restrict the beam diameter of the light that passes therethrough;

a correcting optical system that is disposed between the diaphragm mechanism and the spatial light modulator, that comprises a pair of axicon lenses that are disposed such that conical surfaces thereof face each other, and which, during recording, corrects the light that has passed through the opening portion in the diaphragm mechanism so as to flatten the light intensity distribution thereof on an irradiated surface of the spatial light modulator and, during reproduction, corrects the light that has passed through the opening portion in the diaphragm mechanism such that a region other than the signal light region of the spatial light modulator is irradiated therewith; and a light guiding section that guides the light that has been corrected by the correcting optical system to the spatial light modulator, wherein, during recording, the signal light and the reference light generated by the spatial light modulator are irradiated onto an optical recording medium and a hologram is recorded into the optical recording medium, and during reproduction, the reference light generated by the spatial light modulator is irradiated onto the optical recording medium on which the hologram has been recorded, and the signal light is reproduced.

4. The optical recording and reproduction device according to claim 3, further comprising a mask that is disposed between the light source and the correcting optical system and comprises a blocking portion that blocks the light in the vicinity of the optical axis.

5. The optical recording and reproduction device according to claim 4, wherein the pair of axicon lenses that form the correcting optical system are disposed such that conical surfaces thereof face each other and are disposed apart from each other by a distance L that is defined in the following expression:

$$L = \frac{D}{2\tan\left[\sin^{-1}\left\{n\sin\left(\frac{\pi-\varphi}{2}\right)\right\} - \frac{\pi-\varphi}{2}\right]}$$

wherein, the distance L is an optical axis component distance of an optical path length between the axicon lenses, φ represents the angle of the apex angle of the axicon lenses, D represents the beam diameter of the light incident on the axicon lenses, and n represents the index of refraction of the axicon lenses, with the index of refraction in air being 1.

6. The optical recording and reproduction device according to claim 5, wherein
the correcting optical system, during reproduction, corrects the light that has passed through the opening portion in the diaphragm mechanism into ring-shaped light that corresponds to the shape of the reference light region of the spatial light modulator, and
the light guiding section guides the ring-shaped light generated by the correcting optical system to the reference light region of the spatial light modulator while adjusting the optical path of that light.

7. The optical recording and reproduction device according to claim 4, wherein
the correcting optical system, during reproduction, corrects the light that has passed through the opening portion in the diaphragm mechanism into ring-shaped light that corresponds to the shape of the reference light region of the spatial light modulator, and
the light guiding section guides the ring-shaped light generated by the correcting optical system to the reference light region of the spatial light modulator while adjusting the optical path of that light.

8. The optical recording and reproduction device according to claim 3, wherein the pair of axicon lenses that form the correcting optical system are disposed such that conical surfaces thereof face each other and are disposed apart from each other by a distance L that is defined in the following expression:

$$L = \frac{D}{2\tan\left[\sin^{-1}\left\{n\sin\left(\frac{\pi-\varphi}{2}\right)\right\} - \frac{\pi-\varphi}{2}\right]}$$

wherein, the distance L is an optical axis component distance of an optical path length between the axicon lenses, $\phi$ represents the angle of the apex angle of the axicon lenses, D represents the beam diameter of the light incident on the axicon lenses, and n represents the index of refraction of the axicon lenses, with the index of refraction in air being 1.

9. The optical recording and reproduction device according to claim 8, wherein
the correcting optical system, during reproduction, corrects the light that has passed through the opening portion in the diaphragm mechanism into ring-shaped light that corresponds to the shape of the reference light region of the spatial light modulator, and
the light guiding section guides the ring-shaped light generated by the correcting optical system to the reference light region of the spatial light modulator while adjusting the optical path of that light.

10. The optical recording and reproduction device according to claim 3, wherein
the correcting optical system, during reproduction, corrects the light that has passed through the opening portion in the diaphragm mechanism into ring-shaped light that corresponds to the shape of the reference light region of the spatial light modulator, and
the light guiding section guides the ring-shaped light generated by the correcting optical system to the reference light region of the spatial light modulator while adjusting the optical path of that light.

\* \* \* \* \*